United States Patent [19]
Kawai et al.

[11] Patent Number: 5,176,213
[45] Date of Patent: Jan. 5, 1993

[54] DRIVING FORCE DISTRIBUTION SYSTEM FOR HYBRID VEHICLES

[75] Inventors: Masao Kawai; Yukihiro Minezawa; Yutaka Hotta, all of Anjo, Japan

[73] Assignee: Aisin AW Co., Ltd., Japan

[21] Appl. No.: 560,268

[22] Filed: Jul. 31, 1990

Related U.S. Application Data

[63] Continuation of Ser. No. 277,119, Nov. 29, 1988, abandoned.

[30] Foreign Application Priority Data

Dec. 9, 1987 [JP] Japan ................................. 62-313049

[51] Int. Cl.⁵ .............................................. B60K 6/00
[52] U.S. Cl. ................................... 180/243; 180/65.2; 180/65.4; 60/711; 60/719; 364/424.01
[58] Field of Search .................... 180/242, 243, 65.2, 180/65.4; 364/431.01, 431.1, 424.01, 424.05, 431.12; 60/717, 719, 711

[56] References Cited

U.S. PATENT DOCUMENTS

| | | | |
|---|---|---|---|
| 3,503,464 | 3/1970 | Yardney | 180/65.2 |
| 3,623,568 | 11/1971 | Mori | 180/65.2 |
| 4,180,138 | 12/1979 | Shea | 180/243 |
| 4,305,254 | 12/1981 | Kawakatsu et al. | 364/424.01 |
| 4,438,342 | 3/1984 | Kenyon | 180/65.2 |
| 4,533,011 | 8/1985 | Heidemeyer et al. | 180/65.2 |
| 4,562,894 | 1/1986 | Yang | 180/65.2 |
| 4,697,660 | 10/1987 | Wu et al. | 180/65.2 |
| 4,923,025 | 5/1990 | Ellers | 180/65.2 |
| 4,926,329 | 5/1990 | Stelter et al. | 364/424.01 |

FOREIGN PATENT DOCUMENTS 69403 4/1983 Japan .................................. 180/65.2

Primary Examiner—Charles A. Marmor
Assistant Examiner—Anne Boehler
Attorney, Agent, or Firm—Lorusso & Loud

[57] ABSTRACT

In a hybrid vehicle in which the front or rear set of wheels is driven by an engine (7) and the other set of wheels is driven by a motor (8), a traveling mode deciding unit (4) is provided with a table for deciding engine throttle opening and motor output, with driving force being distributed in accordance with the engine throttle opening and motor output decided by referring to the table. The table decides the traveling mode based on signals from a detector (2) which detects the remaining life of a battery, a vehicle velocity sensor (1) and an accelerator opening sensor (3). By deciding the traveling mode using such a table, it is possible to distribute driving efficiently in dependence upon the remaining life of the battery.

3 Claims, 4 Drawing Sheets

DRIVING FORCE DISTRIBUTION SYSTEM FOR HYBRID VEHICLES

This application is a continuation of application Ser. No. 07/277,119 filed Nov. 29, 1988, now abandoned.

BACKGROUND OF THE INVENTION

This invention relates to a driving force distribution system in a hybrid vehicle of the type in which the front or rear set of wheels is driven by an engine and the other set of wheels is driven by a motor. The distribution system is adapted to changeover the distribution of driving force based on the amount of charge remaining in a battery.

There have been various proposals relating to four-wheel drive hybrid vehicles in which the front or rear set of wheels is driven by an engine and the other set of wheels is driven by motors. The applicant has also made a number of such proposals. According to one such proposal (see Japanese Patent Application No. 62-37183), the distribution of driving force to the front and rear wheels is performed based on accelerator opening, vehicle velocity and shift lever position, and the distributed values are revised based on the amount of battery charge. The proposal as disclosed in the previous application will now be described.

FIG. 1 is a view illustrating an example of the control system configuration of a hybrid vehicle, FIG. 2 is a block diagram showing an example of the construction of a control circuit, and FIG. 3 is a view illustrating the relationship between the amount of battery charge and various detected values. Shown are an engine 11, controllers 12 and 16, a battery 13, a detector 14 for detecting the amount of battery charging (the amount of remaining battery life), a computer 15 for control, motor 17 and 18, an input interface 21, a CPU 22, a ROM 23, a RAM 24, and an output interface 25.

As shown in FIG. 1, the engine 11 drives the front wheels of the vehicle and the motors 17, 18 the rear wheels of the vehicle. The battery 13 is used as the power supply for the motors 17, 18. The detector 14 detects the amount of charge in the battery 13 based on the battery voltage or current, the concentration of the battery electrolyte or the specific gravity of the electrolyte. The output signal of the detector 14 is applied to the control computer 15. As shown in FIG. 2, the control computer 15 includes the CPU 22, the ROM 23, the RAM 24, the input interface 21 and the output interface 25 and is adapted to set vehicle driving force based on accelerator opening, vehicle velocity, shift lever position and the like, as well as the front and rear wheel torque distribution values based on load where each of the front and rear wheels contact the ground, this in turn being based upon the load distribution of the vehicle. The torque distribution values are outputted to the controllers 12, 16 upon correcting the torque distribution values in dependence the amount of charge in such a manner that the value of torque distributed to the motors 17, 18 is decreased and the value of torque distributed to the engine 11 increased correspondingly if the amount of battery charge is small. The engine controller 12 controls engine torque by controlling throttle opening or the amount of fuel injection in accordance with the torque distribution value. The motor controller 16 controls motor torque by controlling the current which flows through the motors in accordance with the torque distribution value.

The specific gravity and concentration of the electrolyte and the battery voltage vary depending upon the amount of charge, as shown in FIG. 3. As in conventional vehicles, means for ascertaining the amount of battery charge include an ammeter for detecting charging/discharging current, a voltmeter for detecting battery voltage, and a battery charge lamp which provides a warning indication when battery voltage falls below a reference value, The driver operates the vehicle while determining the amount of battery charge by observing these instruments. The detector 14 detects the amount of battery charge from battery voltage or current or from the concentration or specific gravity of the electrolyte basically in the same manner as the abovementioned instruments.

With this hybrid vehicle driving force distribution system arranged as described above, motor and engine outputs are adjusted by the control computer 15 so as to lower motor output and reduce power consumption when it is determined that there is a small amount of charge in battery 13. In other words, control is such that motor driving force is reduced by decreasing motor output while engine output is raised correspondingly. The end result is that overall driving force of the vehicle does not change.

However, with this hybrid vehicle driving force distribution system, the amount of battery charge can be determined in terms of only three stages, namely high, medium and low. A problem which arises as a result of this is that when the amount of charge changes, driving force distribution suddenly changes and therefore the vehicle cannot travel in a stable manner.

Another problem is that since there is no charging mode, the battery cannot be charged automatically when there is a decrease in the amount of battery charge. As a result, nothing can be done to check consumption of the battery.

SUMMARY OF THE INVENTION

Accordingly, an object of the present invention is to provide a driving force distribution system in which the output of a driving motor in a hybrid vehicle can be finely set in dependence upon the amount of charge in a power supply.

Another object of the present invention is to provide a driving force distribution system in which the service life of a battery is prolonged.

Still another object of the present invention is to provide a driving force distribution system in which the distribution of driving force is suitably performed to stabilize vehicle travel by eliminating sudden fluctuations in driving force.

According to the present invention, the foregoing objects are attained by providing a driving force distribution system in a hybrid vehicle in which the front or rear set of wheels is driven by an engine and the other set of wheels is driven by a motor, characterized by having a table for deciding engine throttle opening and motor output from amount of battery charge, vehicle velocity and accelerator opening, with driving force being distributed in accordance with engine throttle opening and motor output decided upon referring to the table.

In accordance with the above arrangement, engine throttle opening and motor output are set in the table in dependence upon the values of the amount of battery charge, vehicle velocity and accelerator opening, thereby making it possible to change driving force finely in dependence upon vehicle traveling conditions, such as velocity, and the amount of battery charge. As a result, driving force can be distributed without a sudden change in the driving force.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

DESCRIPTION OF THE PREFERRED EMBODIMENT

An embodiment of the present invention will now be described with reference to the drawings.

Figure 1:
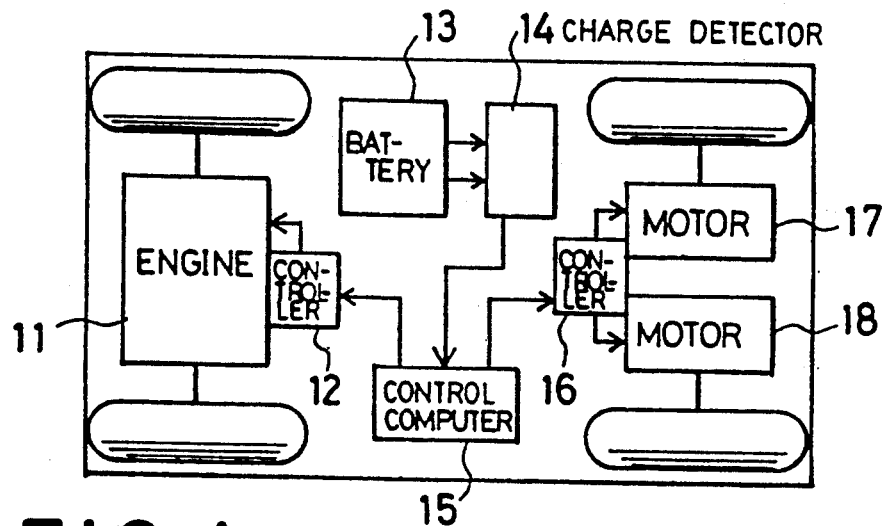
FIG. 1 is a view showing the control system configuration of a hybrid vehicle.
Figure 2:
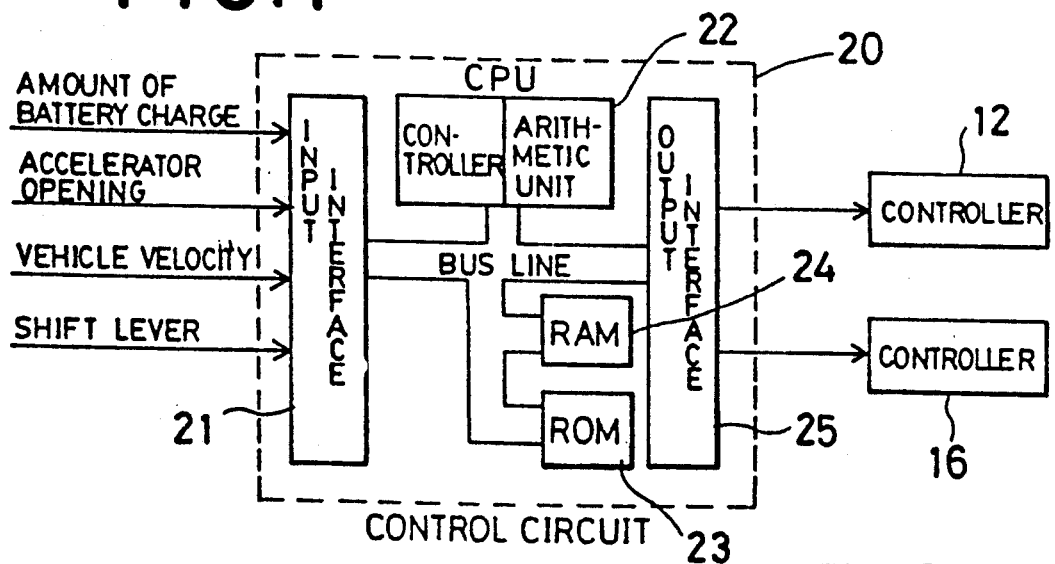
FIG. 2 is a block diagram showing an example of the construction of a control circuit.
Figure 3:
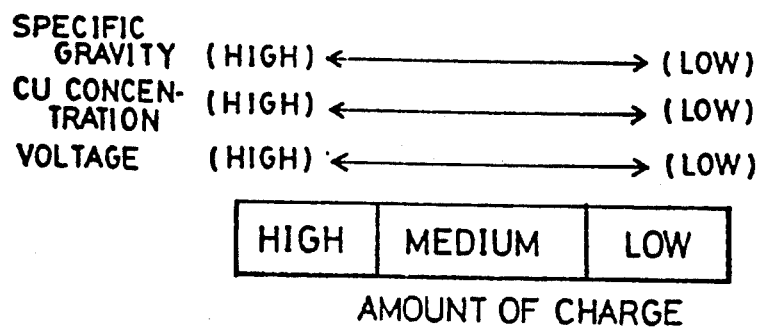
FIG. 3 is a view illustrating the relationship between the amount of battery charge and various detected values.
Figure 4:
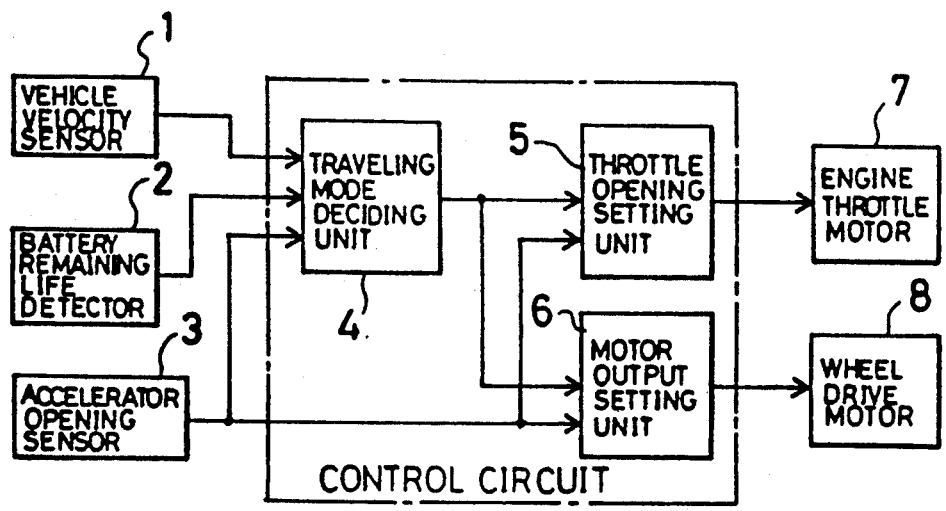
FIG. 4 is a view illustrating the construction of an embodiment of a hybrid vehicle control system according to the present invention.
Figure 5:
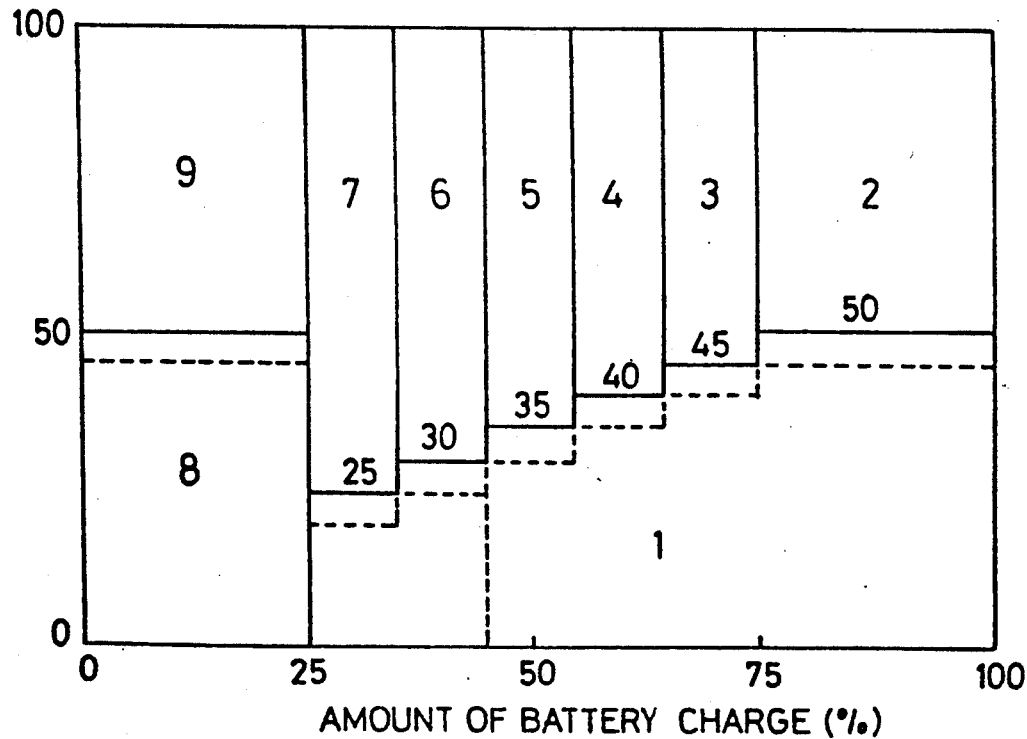
FIGS. 5 and 7 are views illustrating an example of a three-dimensional map.

With reference to FIG. 4, there is shown a vehicle velocity sensor 1, a detector 2 for detecting amount of battery charge, an accelerator opening sensor 3, a traveling mode deciding unit 4, a throttle opening deciding unit 5, a data output deciding unit 6, an engine throttle motor controller 7, and a wheel drive motor controller 8. The traveling mode deciding unit 4, throttle opening deciding unit 5 and data output deciding unit 6 indicate the functional construction of the control circuit 20 of FIG. 2 in block form. The traveling mode deciding unit 4 has a three-dimensional map comprising vehicle velocity, accelerator opening and amount of battery charge. Driving force distribution (the decision of traveling mode) is performed based on the map. FIG. 5 illustrates an example of a three-dimensional map, specifically the relationship between accelerator opening and amount of battery charge at vehicle velocities below 40 km/h (the dashed line indicates a velocity of 37 km/h). The numerals 1, 2, 3, ... in the map indicate traveling modes. For each traveling mode, the throttle opening deciding unit 5 possesses a table in which throttle openings (engine output distribution values) corresponding to accelerator openings are registered. The deciding unit 5 selects a table depending upon the traveling mode and, by referring to the selected table, decides the throttle opening which corresponds to the accelerator opening. The engine throttle motor controller 7 is controlled in accordance with the throttle opening. The data output deciding unit 6 also has a table for each traveling mode, each table having registered data outputs corresponding to throttle openings. The deciding unit 6 selects a table depending upon the traveling mode and, by referring to the selected table, decides the data output which corresponds to the accelerator opening. The wheel drive motor controller 8 is controlled in accordance with the motor output value.

Figure 7:
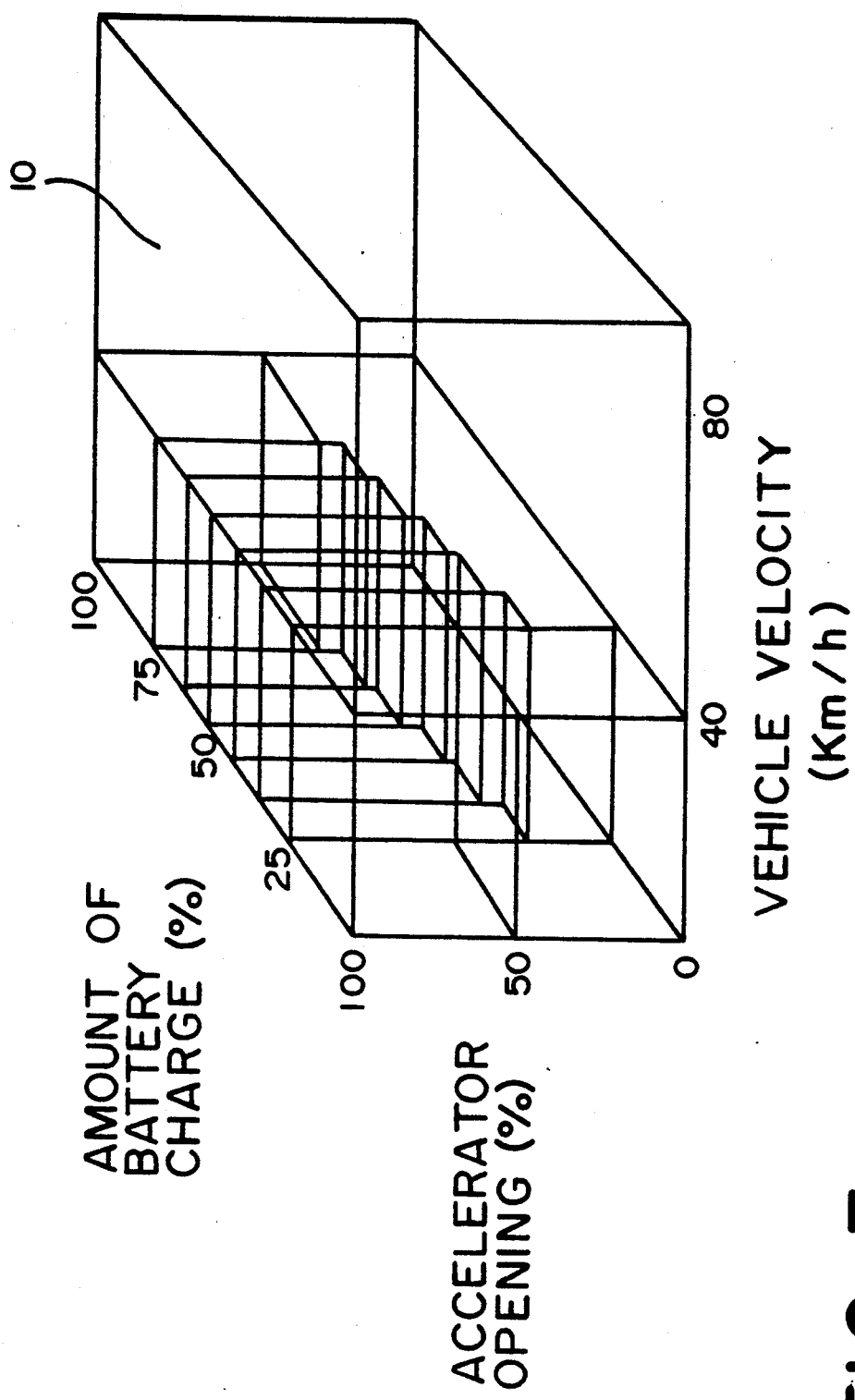

In FIGS. 5 and 7 illustrate three-dimension data maps useable in the present invention. Numeral 1 in FIG. 5 denotes a traveling mode involving solely the motor, in which distribution of output conforming to the amount of charge is performed as indicated in the following table:

| Amount of Charge (%) | 25-35 | 35-45 | 45-55 |
|---|---|---|---|
| Maximum Output (%) | 50 | 60 | 70 |
| Amount of Charge (%) | 55-65 | 65-75 | 75-100 |
| Maximum Output (%) | 80 | 90 | 100 |

Numerals 2 through 7 in FIG. 5 denote hybrid traveling modes, in which maximum output conforming to each amount of charge is distributed as motor output, with 0-100% being apportioned to engine output. Numeral 8 denotes a charging mode, and 9 an engine traveling mode. Numeral 7 denotes an engine traveling mode in which maximum vehicle velocity of the motor is exceeded. The maximum vehicle velocity of the motor is the vehicle velocity obtained when the rotational speed of the motor has reached the maximum allowable speed of the motor. In other words, since regenerative braking acts when maximum vehicle velocity of the motor is exceeded, in this mode the motor drive system is placed in neutral and the vehicle travels under the driving force solely of the engine.

In the hybrid vehicle driving force distribution system of the present invention, throttle opening and motor output are decided in accordance with the various modes and accelerator openings using the map and tables. Moreover, the maximum amount of motor output is varied in accordance with the amount of battery charge; when the amount of battery charge decreases, the output of the motor is reduced. When the amount of battery charge falls below a predetermined amount, the charging mode is established at a small accelerator opening and the engine traveling mode is established at a large accelerator opening.

Figure 6:
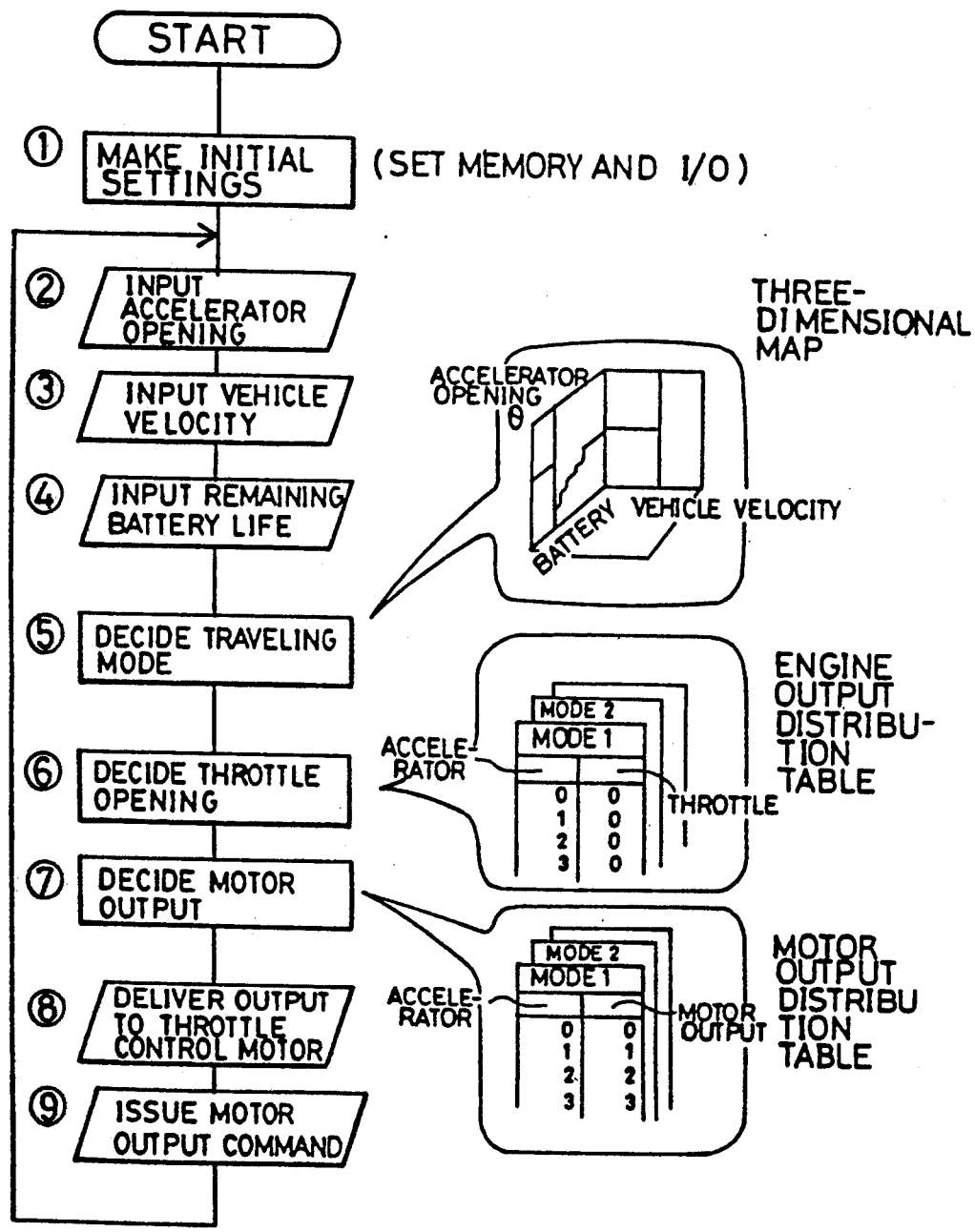
FIG. 6 is a flowchart for describing the flow of driving force distribution processing.

The flow of driving force distribution processing will now be described with reference to the flowchart of FIG. 6.

First, initial settings are made at a step 1, after which detection signals indicative of accelerator opening, vehicle velocity and remaining life of the battery are inputted at steps 2, 3 and 4. Next, on the basis of these detection signals, the traveling mode is decided by referring to the three-dimensional map at a step 5. This is followed by a step 6, at which throttle opening corresponding to accelerator opening is decided by referring to the engine output distribution table on the basis of the decided traveling mode, and then a step 7, at which motor output value corresponding to accelerator opening is decided by referring to the motor output distribution table on the basis of the decided traveling mode. Finally, output control of the engine throttle motor and wheel drive motor is executed based upon the decided values.

Thus, in accordance with the present invention as described above, motor output is set finely in accordance with the amount of battery charge so that battery service life can be prolonged per charge. In addition, stable vehicle travel is assured since sudden fluctuations in driving force are prevented from occurring.

As many apparently widely different embodiments of the present invention can be made without departing from the spirit and scope thereof, it is to be understood that the invention is not limited to the specific embodiments thereof except as defined in the appended claims.

What we claim is:

1. A hybrid vehicle comprising:

front and rear sets of wheels;

an internal combustion engine for driving one set of said first and second sets of wheels;

an electric motor for driving the other set of said first and second sets of wheels;

a battery for supplying power to said electric motor;

an accelerator opening sensor for detecting the degree of accelerator opening;

a battery charge amount detector for detecting the amount of battery charge of said battery;

travelling mode deciding means for selecting a travelling mode by comparing the detected degree of accelerator opening and the detected amount of battery charge with predetermined values for degree of accelerator opening and amount of battery charge provided as a map correlating said predetermined values with a plurality of travelling modes;

throttle opening setting means for controlling the output of said engine by selecting an engine output distribution table corresponding to the selected travelling mode from among a plurality of engine output distribution tables providing predetermined values for throttle opening correlated with predetermined values for accelerator opening, for selecting a throttle opening value corresponding to the detected accelerator opening from said selected engine output distribution table and for setting the throttle opening in accordance with the selected throttle opening value; and motor output setting means for controlling the output of said motor by selecting a motor output distribution table corresponding to the selected travelling mode from among a plurality of motor output distribution tables providing predetermined motor output values correlated with predetermined values for accelerator opening, for selecting a motor output value corresponding to the detected accelerator opening from said selected motor output distribution table and for setting the motor output in accordance with the selected motor output value.

2. A hybrid vehicle according to claim 1, wherein said plurality of travelling modes comprises:

a first, battery charging mode selected responsive to detection of an amount of battery charge less than a threshold amount; and at least a second travelling mode, selected responsive to detection of an amount of battery charge exceeding said threshold amount, wherein said motor output is decreased as the detected amount of battery charge decreases.

3. A hybrid vehicle according to claim 1 further comprising a speed sensor for detecting actual vehicle speed, wherein said map is a three-dimensional map correlating said predetermined map values for degree of accelerator opening and battery charge with plural predetermined map values for vehicle speed, and wherein a travelling mode is selected by comparing detected vehicle speed, detected battery charge and detected degree of accelerator opening with said predetermined map values.

* * * * *

UNITED STATES PATENT AND TRADEMARK OFFICE
CERTIFICATE OF CORRECTION

PATENT NO. : 5,176,213
DATED : January 5, 1993
INVENTOR(S) : KAWAI, ET AL

It is certified that error appears in the above-indentified patent and that said Letters Patent is hereby corrected as shown below:

Col. 2 line 9, delete the comma "," and insert a period --.--.
Col. 4, line 21, before "7" insert --10 in Fig.--

Signed and Sealed this

Twenty-third Day of November, 1993

Attest:

BRUCE LEHMAN

Attesting Officer      Commissioner of Patents and Trademarks